(12) United States Patent
Wilson et al.

(10) Patent No.: US 11,536,243 B2
(45) Date of Patent: Dec. 27, 2022

(54) WAVE ENERGY CONVERTER BUOY WITH VARIABLE GEOMETRY

(71) Applicants: National Technology & Engineering Solutions of Sandia, LLC, Albuquerque, NM (US); Michigan Technological University, Houghton, NM (US)

(72) Inventors: David G. Wilson, Tijeras, NM (US); Rush D. Robinett, III, Tijeras, NM (US); Wayne W. Weaver, Hancock, MI (US); Steven F. Glover, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 17/723,690

(22) Filed: Apr. 19, 2022

(65) Prior Publication Data
US 2022/0252039 A1 Aug. 11, 2022

Related U.S. Application Data

(63) Continuation-in-part of application No. 16/792,749, filed on Feb. 17, 2020, now Pat. No. 11,326,574, (Continued)

(51) Int. Cl.
 *F03B 13/20* (2006.01)
(52) U.S. Cl.
 CPC .................................. *F03B 13/20* (2013.01)

(58) Field of Classification Search
 CPC ................. F03B 13/20; F05B 2250/02; F05B 2250/232; F05B 2260/821; F05B 2270/404
 See application file for complete search history.

(56) References Cited

U.S. PATENT DOCUMENTS

| 4,447,740 A | 5/1984 | Heck |
| 5,136,173 A | 8/1992 | Rynne |
| (Continued) | | |

OTHER PUBLICATIONS

Wolgamont, H.A. and Fitizgerald, C.J., "Nonlinear Hydrodynamic and Real Fluid Effects on Wave Energy Converters", Proc. Inst. Mech Eng. A: J. Power Eng. (2015), pp. 772-794, vol. 229.
(Continued)

*Primary Examiner* — Jesse S Bogue
(74) *Attorney, Agent, or Firm* — Kevin W. Bieg

(57) ABSTRACT

A nonlinear control design technique capitalizes on a wave energy converter comprising a shaped buoy having a variable geometry wave energy. For example, the shaped buoy can have an hourglass (HG) geometry having a variable cone or steepness angle. The HG buoy is assumed to operate in the heave motion of the wave. The unique interaction between the HG buoy and the wave creates a nonlinear cubic storage effect that produces actual energy storage or reactive power during operation. A multi-frequency Bretschneider spectrum wave excitation input was simulated for the HG design both with constant and varying steepness angle profiles which demonstrated further increased power generation with changing sea states for the variable design.

9 Claims, 10 Drawing Sheets

Related U.S. Application Data which is a continuation-in-part of application No. 16/534,746, filed on Aug. 7, 2019, now Pat. No. 10,823,134.

(60) Provisional application No. 62/927,590, filed on Oct. 29, 2019, provisional application No. 62/927,318, filed on Oct. 29, 2019, provisional application No. 62/730,891, filed on Sep. 13, 2018.

(56) References Cited

U.S. PATENT DOCUMENTS

| | | | |
|---|---|---|---|
| 8,464,527 | B2 | 6/2013 | Gerger et al. |
| 8,713,928 | B2 | 5/2014 | Gregory |
| 8,925,313 | B2 | 1/2015 | Moffat |
| 9,657,710 | B2 | 5/2017 | Gregory |
| 9,951,747 | B2 | 4/2018 | Prins |
| 10,190,568 | B2 | 1/2019 | Gregory |
| 10,385,820 | B2 | 8/2019 | Moffat et al. |
| 2010/0171312 | A1* | 7/2010 | Burns ............... F03B 13/1885 441/29 |
| 2011/0089689 | A1* | 4/2011 | Gregory ............... F03B 13/20 290/53 |
| 2015/0145250 | A1* | 5/2015 | Frtunik ............... H02K 7/1876 290/53 |
| 2018/0202415 | A1 | 7/2018 | Moffat | |

OTHER PUBLICATIONS

Giorgi, G. et al.," Nonlinear Hydrodynamic Models for Heaving Buoy Wave Energy Converters", Asian Wave and Tidal Energy Conference (AWTEC 2016), Marina Bay Sands, Signapore (2016), 10 pages.

Retes, M. et al., "A Review of Non-Linear Approaches for Wave Energy Converter Modelling," Proceedings of the 11th European Wave and Tidal Energy Conference, Nantes, France (2015), 10 pages.

Abdelkhalik, O. and Darani, S. "Optimization of Nonlinear Wave Energy Converters", Ocean Engineering, 2018, pp. 187-195, vol. 162.

Darani, S. et al., "A Hamiltonian Surface-Shaping Approach for Control System Analysis and the Design of Nonlinear Wave Energy Converters", Journal of Marine Science and Engineering (2019), vol. 7, 48, 17 pages.

Hals, J. et al., "A Comparison of Selected Strategies for Adaptive Control of Wave Energy Converters", J. Offshore Mech. Arct. Eng. (2011), vol. 133, pp. 031101-1-031101-12.

Song, J. et al., "Multi-Resonant Feedback Control of Heave Wave Energy Converters", Ocean Engineering (2016), pp. 269-278, vol. 127.

Abdelkhalik, O. et al., "Multiresonant Feedback Control of a Three-Degree-of-Freedom Wave Energy Converter", IEEE Transactions on Sustainable Energy (2017), pp. 1518-1527, vol. 8.

Robinett, R. D. and Wilson, D. G., "What Is a Limit Cycle?, International Journal of Control" (2008), pp. 1886-1900, vol. 81.

Wilson, D. G. et al., "Order of Magnitude Power Increase from Multi-Resonance Wave Energy Converters, Order of Magnitude Power Increase from Multi-Resonance Wave Energy Converters," Oceans' 17 MTS/IEEE, Sep. 2017, Anchorage, AK, 7 pages.

Ozkop, E. and Altas, I. H., Control, Power and Electrical Components in Wave Energy Conversion Systems: A Review of the Technologies; Renewable and Sustainable Energy Reviews 67 (2017), pp. 106-115.

Wilson, D. G. et al., "Extending Complex Conjugate Control to Nonlinear Wave Energy Converters," Journal of Marine Science and Engineering 2020, vol. 8, 84, 21 pages.

* cited by examiner

WAVE ENERGY CONVERTER BUOY WITH VARIABLE GEOMETRY

CROSS-REFERENCE TO RELATED APPLICATIONS

This application is a continuation-in-part of U.S. application Ser. No. 16/792,749, filed Feb. 17, 2020, which claims the benefit of U.S. Provisional Application No. 62/927,318, filed Oct. 29, 2019, and U.S. Provisional Application No. 62/927,590, filed Oct. 29, 2019, all of which are incorporated herein by reference. U.S. application Ser. No. 16/792,749 is a continuation-in-part of U.S. application Ser. No. 16/534,746, filed Aug. 7, 2019 and now abandoned, which claims the benefit of U.S. Provisional Application No. 62/730,891, filed Sep. 13, 2018, both of which are incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to wave energy conversion and, in particular, to a wave energy converter buoy with variable geometry.

BACKGROUND OF THE INVENTION

The future electric power grid will require new methods and tools to support and capitalize on high penetration of renewable energy sources (RES). There is a large untapped potential in ocean wave power which is estimated at 1-10 TW of future energy and power generation. See R. Boud, Status and Research and Development Priorities, Wave and Marine Accessed Energy, UK Dept. of Trade and Industry (DTI), DTI Report #FES-R-132, AEAT Report #AEAT/ENV/1054, United Kingdom (2003). Wave energy converters (WECs) are devices that extract energy from waves in a body of water such as the ocean. See J. Falnes, Ocean Waves and Oscillating Systems, Cambridge: NY: Cambridge University Press (2002); and J. Hals et al., J. Offshore Mech. Arct. Eng. 133(3), 031101 (2011). Various types of WEC devices are being reviewed by industry to harvest the ocean energies. The latest WEC technologies are discussed by Ozkop and Altas for WEC types, generator types, implementation methods, validation approaches, and controller types. See E. Ozkop and I. H. Altas, Renew. Sust. Energ. Rev. 67, 106 (2017).

The wave energy source is spatially, temporally, and energetically variable which translates to a predominant frequency of waves, wave heights, and widths of the wave frequency spectrum. Typically, when a wave impacts the WEC device at the resonance frequency, the device can absorb a significant amount of energy from the wave very efficiently. However, when the WEC is off resonance with the impacting waves the WEC operates much less efficiently. Many control methods have been studied and investigated on WEC systems. See E. Ozkop and I. H. Altas, Renew. Sust. Energ. Rev. 67, 106 (2017). These control methods include; phase control, latching control, proportional plus integral (PI) control, optimal and predictive control. See R. G. Coe et al., Int. J. Mar. Energy 20, 45 (2017). Achieving increased power capture over a large range of sea states for stochastic wave profiles are some of the challenges needed to be addressed by current research. Many of the current control designs and modeling efforts are based on linear techniques. Recently, a nonlinear hydrostatic model has been developed by Wilson et al. See D. G. Wilson et al., J. Mar. Sci. Eng. 8(2), 84 (2020); and U.S. application Ser. No. 16/792,749. By exploiting the nonlinear static coupling between an hourglass (HG) buoy geometry and the potentially wideband frequency spectrum of incoming waves, the buoy design can increase power/energy captured.

SUMMARY OF THE INVENTION

A wave energy converter of the present invention comprises a shaped buoy of variable geometry in a body of water having a wave motion, wherein the waves impacting the buoy exert an excitation force with a plurality of excitation frequencies on the buoy that causes a buoy motion in a heave direction relative to a reference and wherein the buoy has a geometry such that a water plane area of the buoy increases with distance away from the water line in the heave direction both above and below the water line, thereby producing reactive power from the wave motion; and a controller configured to vary the geometry of the buoy in response to the wave motion. For example, the shaped buoy can have an hourglass geometry, shapes that are mirrored about the water line, such as mirrored hemispheres, pyramids, ellipsoids, paraboloids, or hyperboloids, or shapes that are not mirrored about the water line.

As an example, a nonlinear control design technique capitalizes on a WEC HG with variable steepness angle. The unique interaction between the HG buoy and the wave creates a nonlinear cubic storage effect that produces actual energy storage or reactive power during operation. This design realizes a practical complex conjugate control (C3) strategy. A multi-frequency Bretschneider spectrum wave excitation input was considered for the HG design both with a constant and varying steepness angle profiles which demonstrated further increased power generation given the potential benefit of intermittent wave measurement previews. Numerical simulations were performed to demonstrate the increase in power and energy capture. The nonlinear geometric/wave interactions in the HG design resulted in implicitly including geometric energy storage/reactive power requirements with increased power generation.

BRIEF DESCRIPTION OF THE DRAWINGS

The detailed description will refer to the following drawings, wherein like elements are referred to by like numbers.

DETAILED DESCRIPTION OF THE INVENTION

In their simplest form, linear WEC point absorbers can be defined for a regular wave, where the excitation force has only one frequency, ω, and it can be shown that the radiation term can be quantified using an added mass and a radiation damping term, each considered at a constant frequency only. See J. N. Newman, Marine Hydrodynamics, The MIT Press, USA (1977); and J. Falnes, Ocean Waves and Oscillating Systems, Cambridge: NY: Cambridge University Press (2002). The equation-of-motion for this simple case is expressed as $$m\ddot{z}+c\dot{z}+kz=F_e+F_u \qquad (1)$$

where m and c are constant mass and damping terms for a given excitation frequency, and k is the linear stiffness term. $F_e$ is the input excitation force and $F_u$ is the control force. Further details for a heave motion linear WEC system can be found in Song et al. See J. Song et al., Ocean Eng. 27, 269 (2016).

Figure 1:
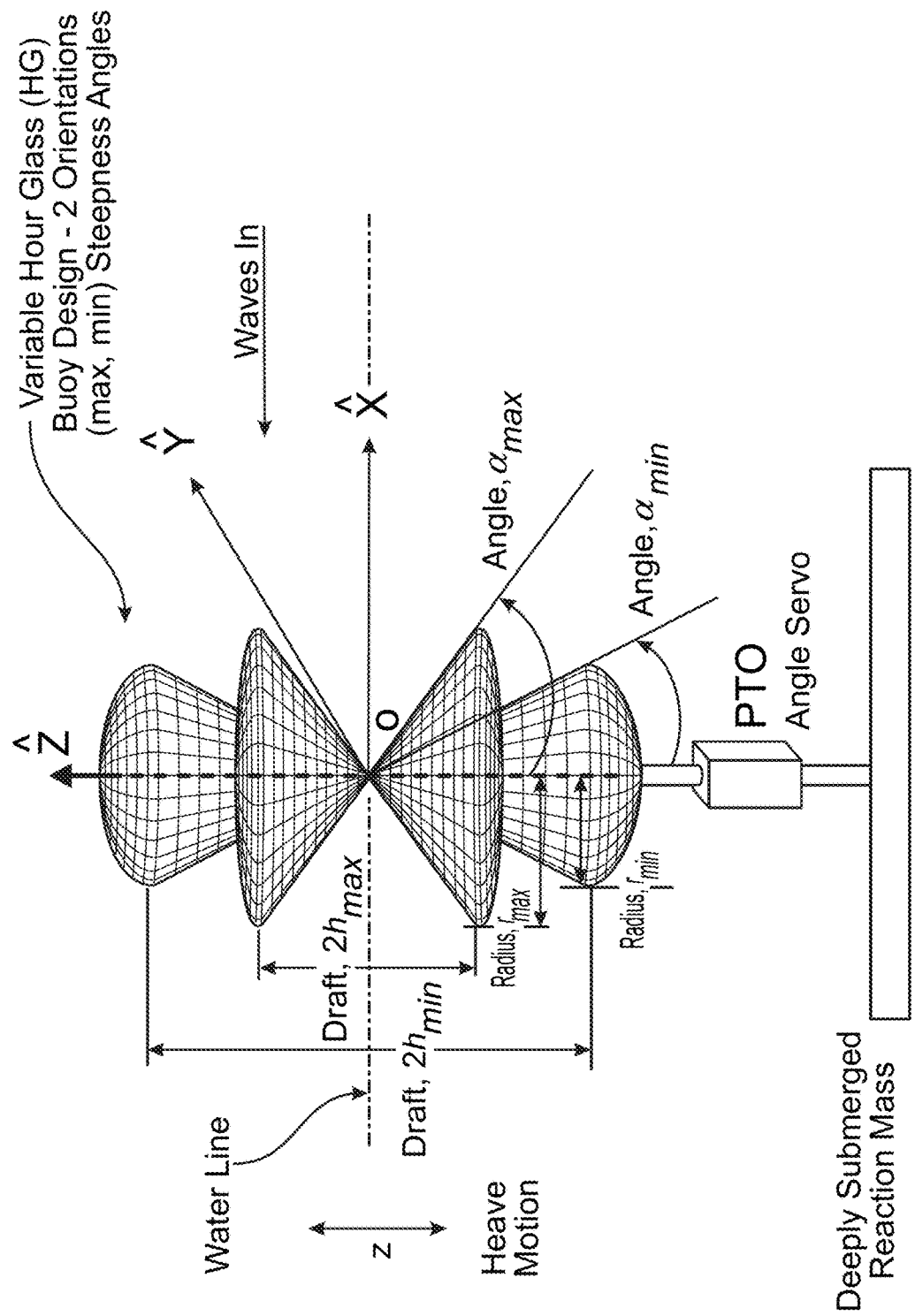
FIG. 1 is a schematic illustration of an hourglass variable geometric buoy design with two configurations shown: maximum and minimum steepness angles which are superimposed.

The heave oscillations for a 1-DOF (degree-of-freedom) buoy relative to a reaction mass can be modeled simply with a power-take-off (PTO) system consisting of a linear actuator as part of the power conversion from mechanical to electrical power. The hourglass (HG) buoy nonlinear variable geometry is shown in FIG. 1. This exemplary HG buoy comprises mirrored right circular cones having a draft, 2h, radius, r, and cone or steepness angle, α. The buoy is mechanically coupled to a reference, in this example a deeply submerged reaction mass. The reactive mass is submerged deep enough for its oscillations to be negligible in wave conditions of interest for power conversion. Therefore, the reaction mass can remain essentially stationary as the buoy moves. The mirrored cone buoy can move up and down along a vertical Z axis in a heaving motion (a real buoy would generally move with three degrees-of-freedom, further including an up/down rotation about a center-of-gravity in a pitching motion, and back-and-forth, side-to-side displacement in a surging motion). The PTO can comprise an actuator that couples the buoy with the reaction mass and can be used to apply a control force or reactive power to the buoy. The PTO actuator assembly can further be configured to convert the buoy mechanical motion to electrical energy, which can then be output by way of a transmission line (not shown). For the variable design, the steepness angle variation with time can be achieved using an angle servo.

The corresponding range of parameters investigated herein is shown in Table I.

Table I. WEC Hourglass Variable Geometry Parameters.

TABLE I

WEC Hourglass Variable Geometry Parameters.

| Buoy | r (m) | h (m) | α (degrees) |
|---|---|---|---|
| HG | 5.72-10.0 | 8.18-2.68 | 35-75 |

Nonlinear Control Driven Buoy Design

At resonance, a WEC device operates at maximum energy absorption. See D. G. Wilson et al., J. Mar. Sci. Eng. 8(2), 84 (2020); and U.S. application Ser. No. 16/792,749. In off-resonance the WEC absorbs less real power and will require reactive power to increase energy capture by enabling resonance. Practically, this can be achieved with model predictive control (MPC) or PDC3 (Proportional-Derivative C3). See J. Hals et al., J. Offshore Mech. Arct. Eng. 133(3), 031101 (2011); G. Li et al., Renew. Energy 48, 392 (2012); J. A. Cretel et al., Maximization of energy capture by a wave-energy point absorber using model predictive control, in 18th IFAC World Congress, Milano (Italy) Aug. 28-Sep. 2, 2011; J. Song et al., Ocean Eng. 27, 269 (2016); and D. G. Wilson et al., Order of Magnitude Power Increase from Multi-Resonance Wave Energy Converters, OCEANS' 17 MTS/IEEE, Anchorage, Ak., Sep. 20-22, 2017. Both techniques require energy storage and power electronic elements. MPC will also need additional wave prediction as a priori input. The present invention utilizes a nonlinear (NL) control design to realize a nonlinear buoy with variable geometry to produce the energy storage and reactive power through the nonlinear coupling between the buoy and wave interaction, thus eliminating the need for energy storage and power electronic elements. See R. D. Robinett III and D. G. Wilson, Nonlinear Power Flow Control Design: Utilizing Exergy, Entropy, Static and Dynamic Stability, and Lyapunov Analysis, Springer-Verlag London Limited 2011; D. G. Wilson et al., J. Mar. Sci. Eng. 8(2), 84 (2020); and U.S. application Ser. No. 16/792,749.

NL Control Design for NL HG Buoy Geometry WEC

A cubic hardening spring can be created by defining the buoy shape as an HG geometry as shown in FIG. 1. See D. G. Wilson et al., J. Mar. Sci. Eng. 8(2), 84 (2020); U.S. application Ser. No. 16/792,749; D. G. Wilson et al., Nonlinear Control Design for Nonlinear Wave Energy Converters, John L. Junkins Dynamical Systems Symposium, College Station, Tex., May 20-21, 2018; and D. G. Wilson et al., Nonlinear WEC Optimized Geometric Buoy Design for Efficient Reactive Power Requirements, OCEANS' 19 MTS/IEEE, Seattle, Wash., Oct. 27-31, 2019. The model uses a small body approximation. The non-uniform water plane area, $S_w$, for the hourglass cone is $$S_W = \pi r(z)^2 = \pi \overline{\alpha}^2 h^2, \text{ where } r=h \tan \alpha = \overline{\alpha} h \qquad (2)$$

The hydrostatic force is proportional to the submerged volume of the body. For very long waves, the wave profile can be considered as having the same value as the vertical coordinate across the cone. That is, z~η where η is the wave elevation. Assuming the neutral buoyancy or water line (i.e., the equilibrium position) is located at the apex of the mirrored cones, the volume as a function of position of the center-of-volume is $$V(z) = \frac{1}{3}\pi\overline{\alpha}^2 h^3 - \frac{1}{3}\pi\overline{\alpha}^2 z^3 = \frac{1}{3}\pi\overline{\alpha}^2\left[h^3 - z^3\right] \qquad (3)$$

The hydrostatic force for the buoy staying in the water is $$F_h = F_g + F_{buoy} = -mg + \rho g V(z) = -\frac{1}{3}\pi\rho g \overline{\alpha}^2 z^3. \qquad (4)$$

A nonlinear WEC model for the HG can be developed from Falnes and Wilson, where the excitation force in heave is dominated by the hydrostatic force. See J. Falnes, Ocean Waves and Oscillating Systems, 1st ed., Cambridge University Press, Cambridge, N Y, 2002; and D. Wilson et al., "10x Power Capture Increased from Multi-Frequency Nonlinear Dynamics," Sandia National Laboratories, SAND2015-10446R (2015). The summarized equation-of-motion is $$m\ddot{z} + c\dot{z} + K_{HG}(\alpha)\left[\frac{1}{3}z^3 - \eta z^2 + \eta^2 z\right] = \frac{1}{3}K_{HG}(\alpha)\eta^3 + F_u \quad (5)$$

which contains the cubic spring term given by $$\frac{1}{3}K_{HG}(\alpha)z^3.$$

The parameter $K_{HG}(\alpha)$ is a function of the steepness angle $\alpha$, buoy mass and geometric properties, as shown in Equation (4) for the case of the HG buoy.

Figure 2:
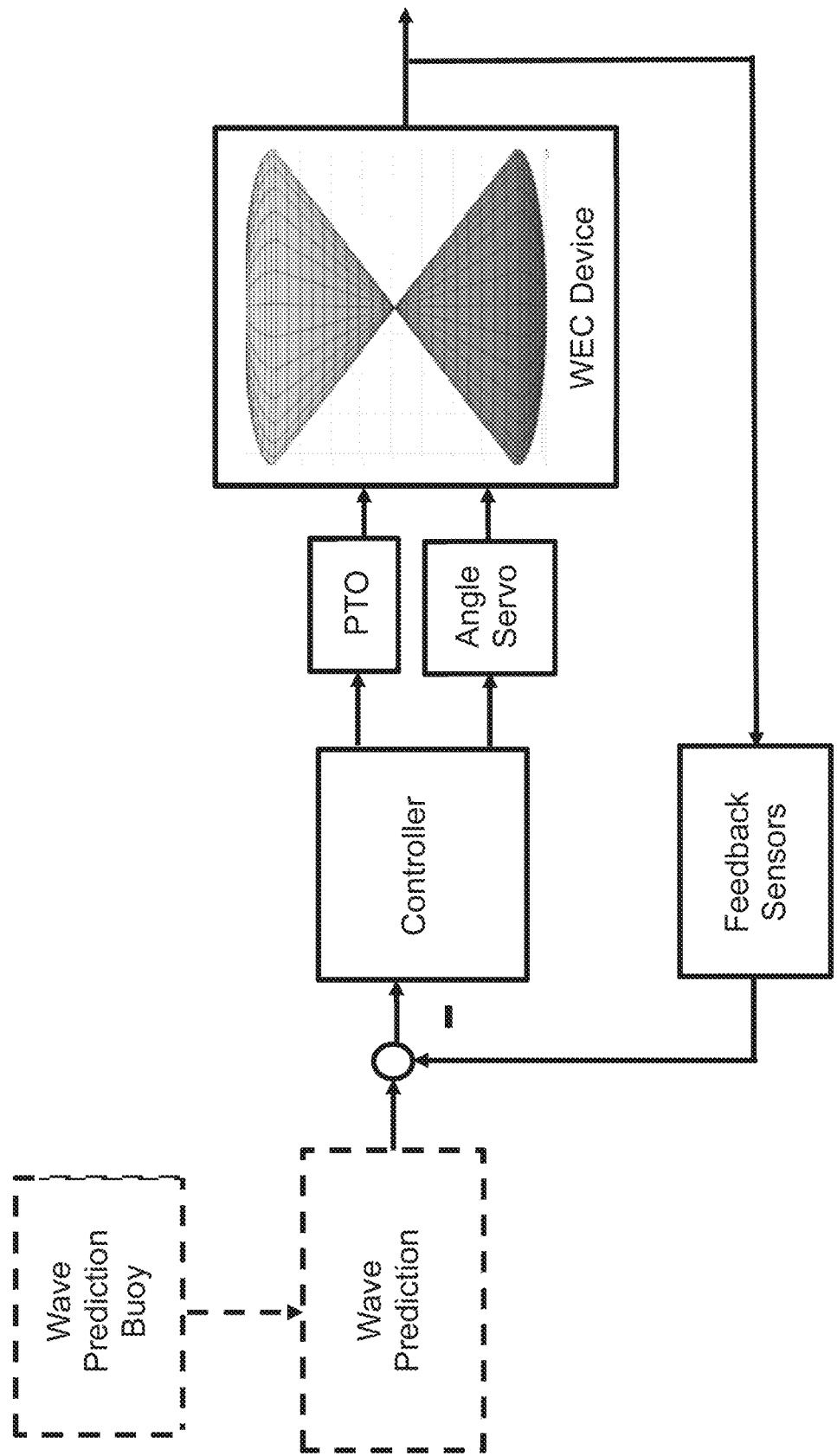
FIG. 2 is a block diagram of a control apparatus for variable geometry WEC system.

FIG. 2 shows a block diagram of a control apparatus for variable geometry WEC system. A Wave Prediction Buoy can be used to measure the incoming wave height and direction. A Wave Prediction algorithm can be used to predict a statistical estimate of the incoming wave height and duration at the buoy from the measured wave height and direction at the Wave Prediction Buoy as controller inputs. The Wave Prediction Buoy and Wave Prediction are a priori inputs to the variable geometry WEC system, as indicated by the dashed line boxes in the block diagram. A Controller provides control for rate feedback control to the PTO and steepness angle control to the angle servo. control to adjust the steepness angle of the variable design, subject to the relative wave height. The PTO control is defined simply as rate feedback or $F_u = -K_D \dot{z}$. The servo control adjusts the steepness angle of the variable design, subject to the relative wave height, according to $$\frac{1}{3}K_{HG}(\alpha)z^3.$$

Feedback Sensors include a PTO rate or velocity feedback sensor and a steepness angle feedback sensor.

Multi-frequency Numerical Simulations

Numerical simulations were performed for a Bretschneider spectrum for both a constant and variable steepness angle for the HG WEC design. In U.S. application Ser. No. 16/792,749, four varying Bretschneider Sea States (SS) were investigated with a constant steepness angle, $\alpha$. Five minute Bretschneider profiles were generated from the MATLAB toolbox. See T. Perez and T. Fossen, Model. Identif. Control 30(1), 1 (2009). The steepness angle was increased in five degree increments until the HG buoy draft constraint was violated. The maximum safe angle was set to the previous value such that the HG buoy would not overtop or exit the water. The results are summarized in Table II for a fixed or constant steepness angle.

TABLE II

Bretschneider Spectrum Sea State Results

| Sea state | Steepness angle (degrees) | Energy (MJ) |
|---|---|---|
| 1 | 65 | 67.170 |
| 2 | 70 | 92.752 |
| 3 | 55 | 174.63 |
| 4 | 65 | 69.790 |

In Wilson et al., the steepness angle was relaxed for one of the larger waves in Sea State 4 and increased power and energy capture was observed. See D. G. Wilson et al., Nonlinear WEC Optimized Geometric Buoy Design for Efficient Reactive Power Requirements, OCEANS' 19 MTS/IEEE, Seattle, Wash., Oct. 27-31, 2019. For this study Sea State 4 was further reviewed and a new scenario was defined that investigates the benefit of utilizing wave estimations with a slower update on $\alpha$. The following numerical simulation results were produced.

Figure 3:
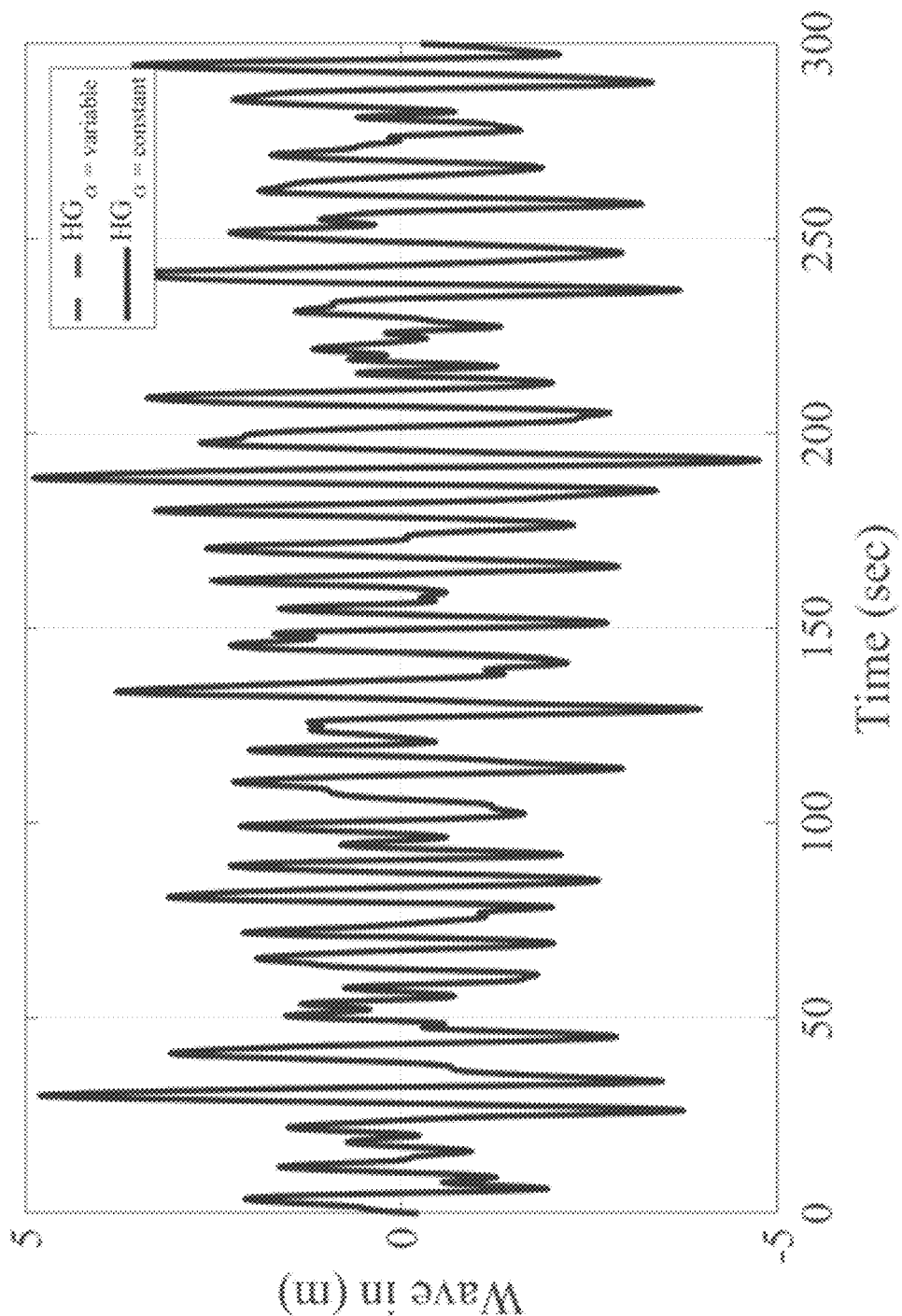
FIG. 3 is a graph of a Bretschneider wave input profile.
Figure 4:
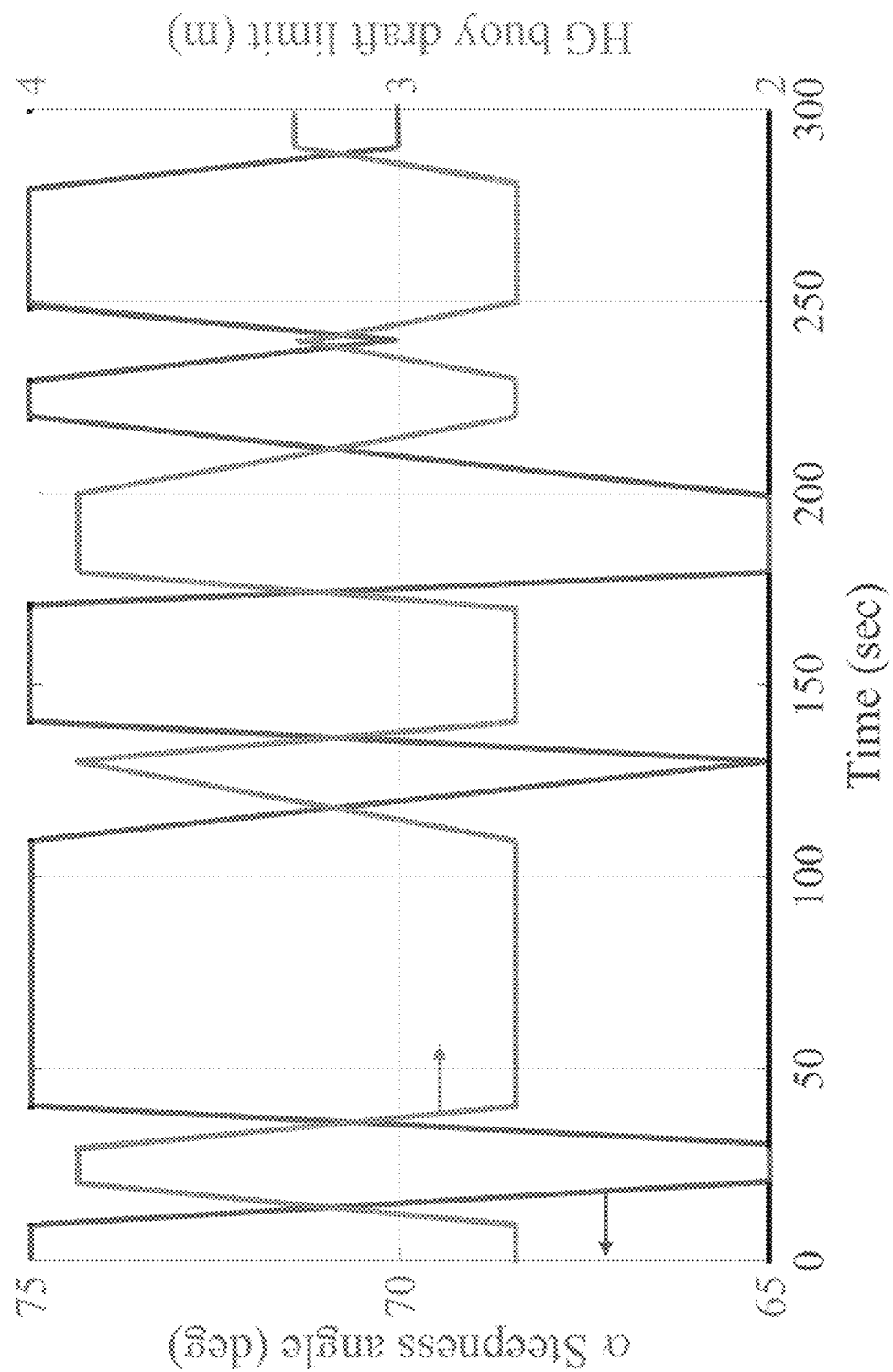
FIG. 4 is a graph of buoy steepness and draft limit specifications as a function of time for the variable geometry hourglass buoy.
Figure 5:
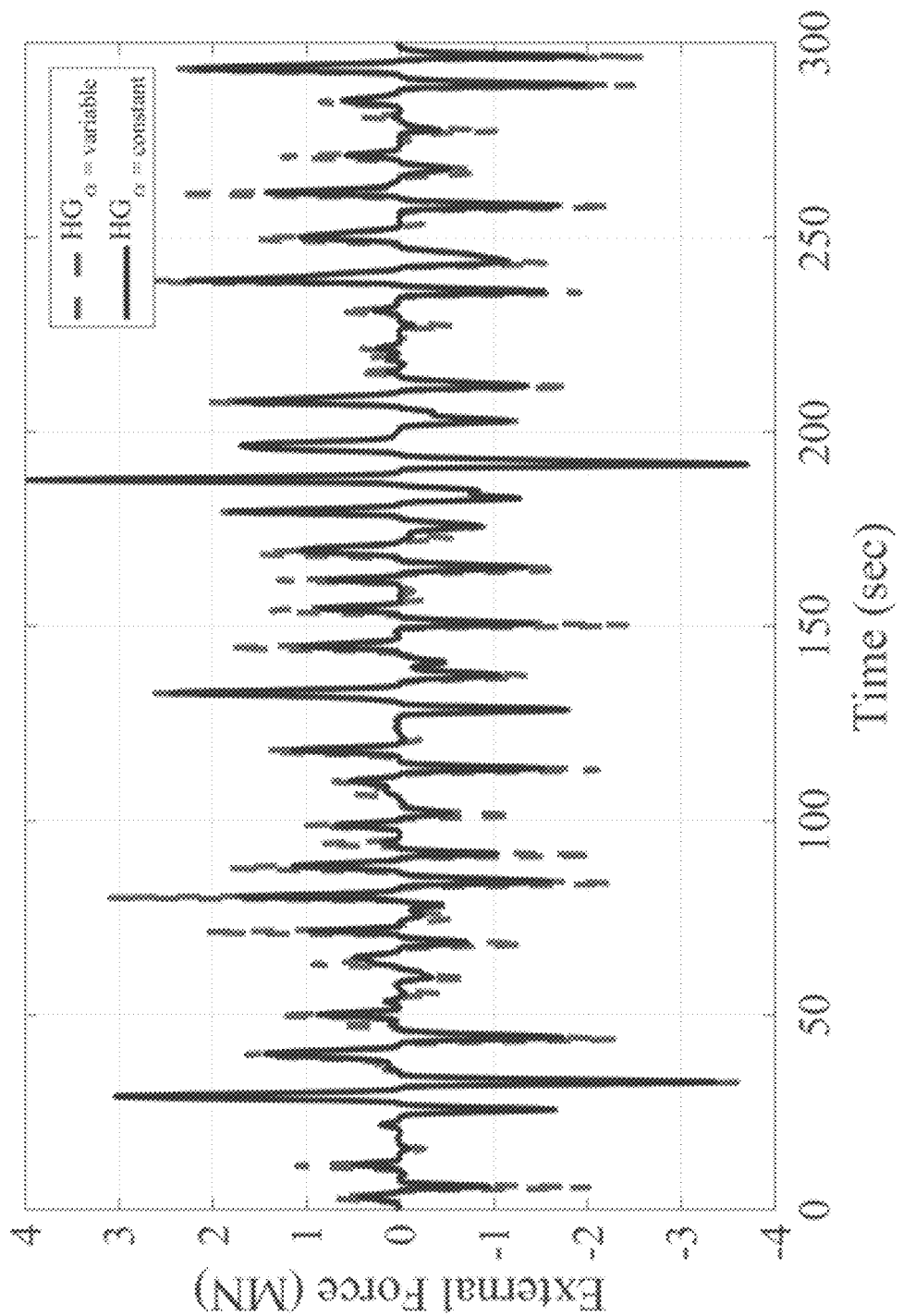
FIG. 5 is a graph of external force responses for the variable and constant steepness angle hourglass buoys.
Figure 6:
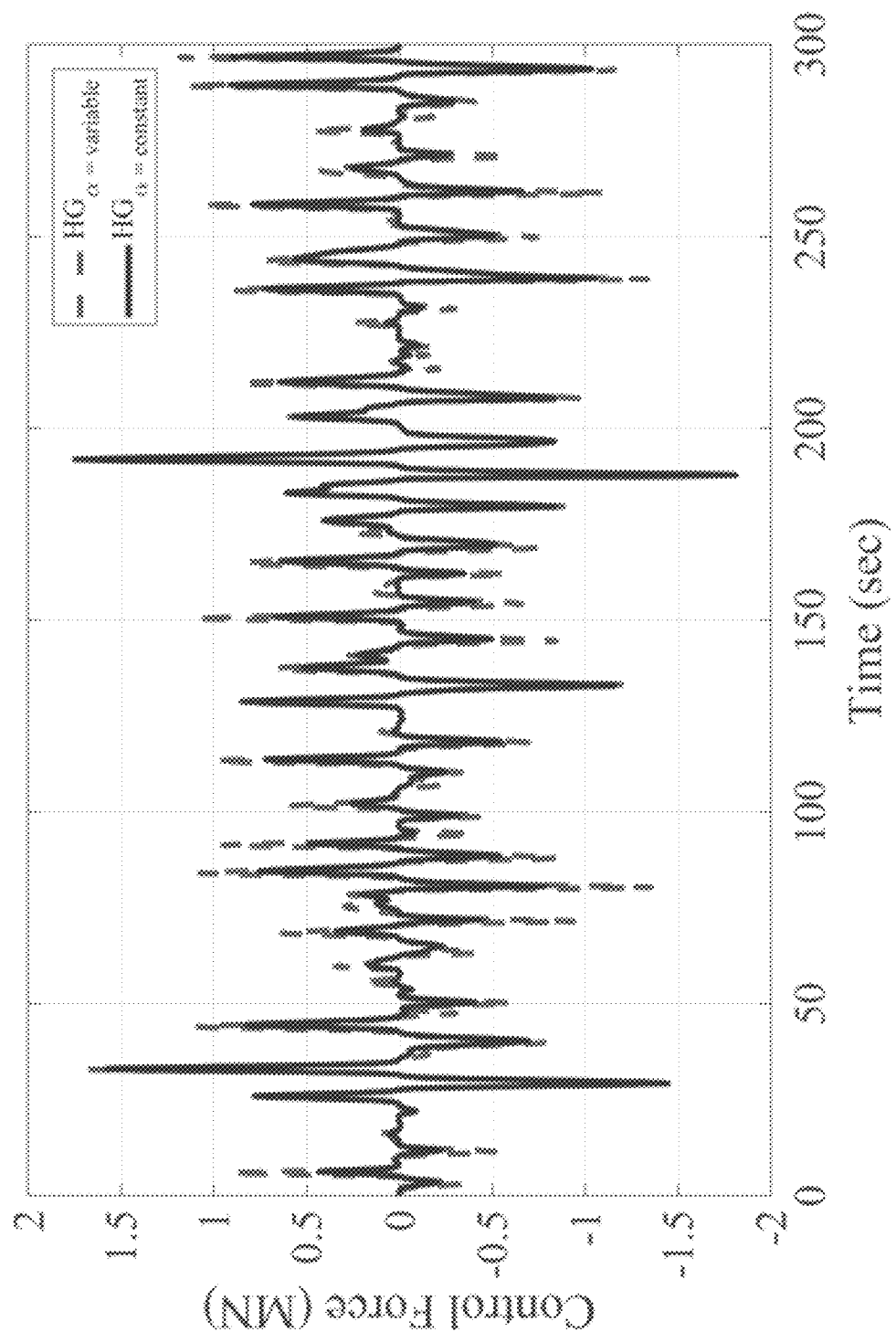
FIG. 6 is a graph of control force responses.
Figure 7:
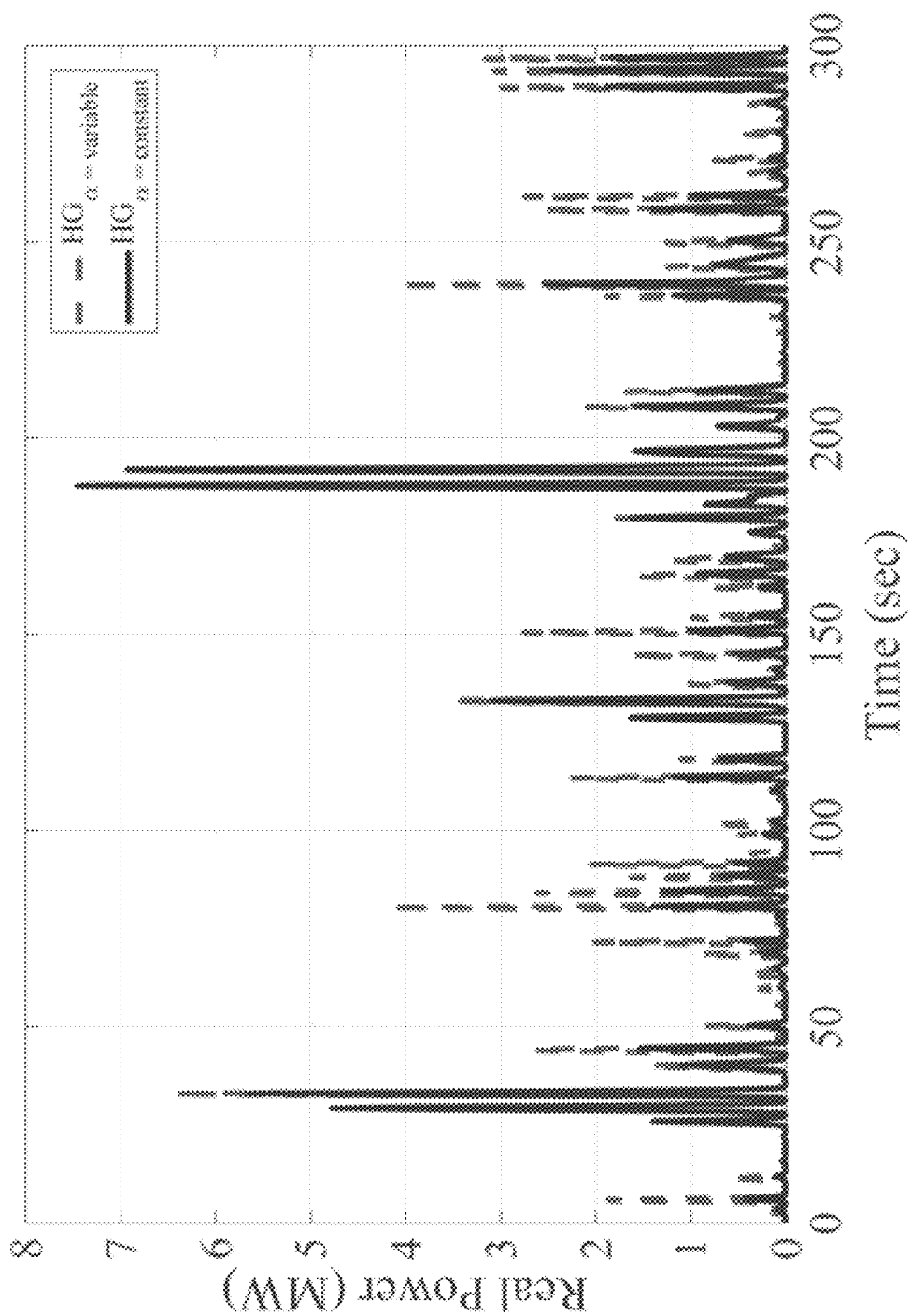
FIG. 7 is a graph of real power responses.
Figure 8:
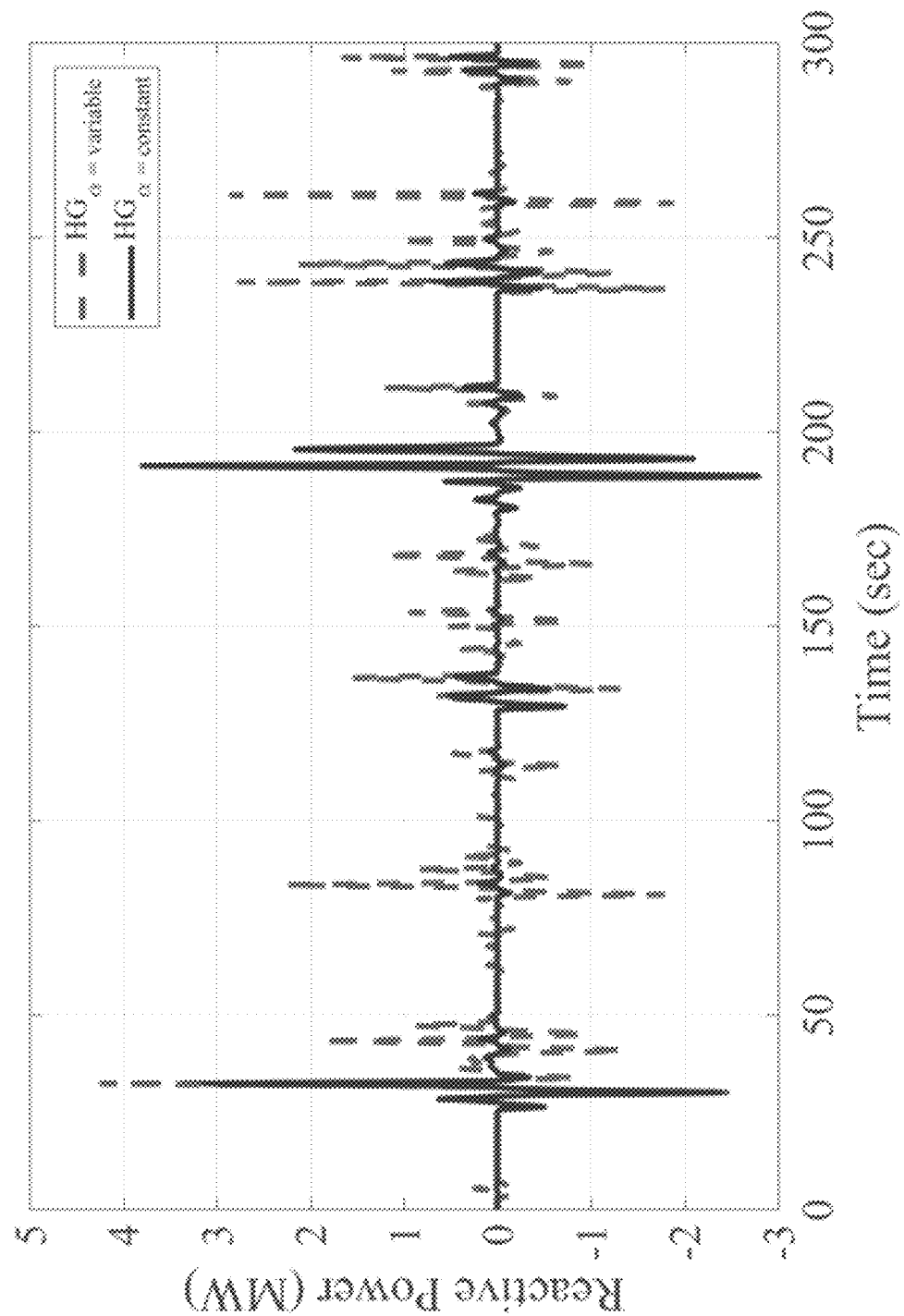
FIG. 8 is a graph of reactive power responses.
Figure 9:
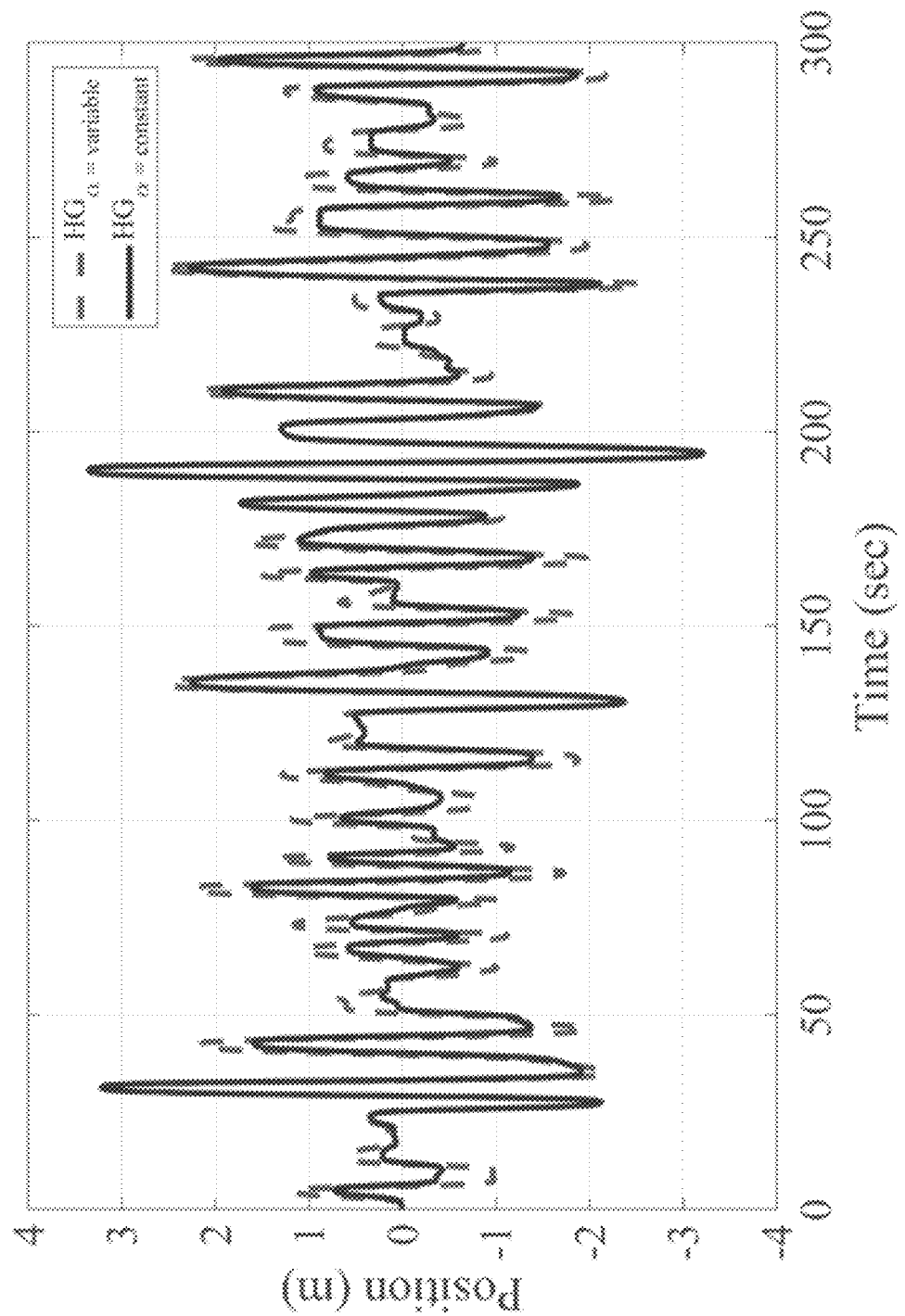
FIG. 9 is a graph of buoy position responses.
Figure 10:
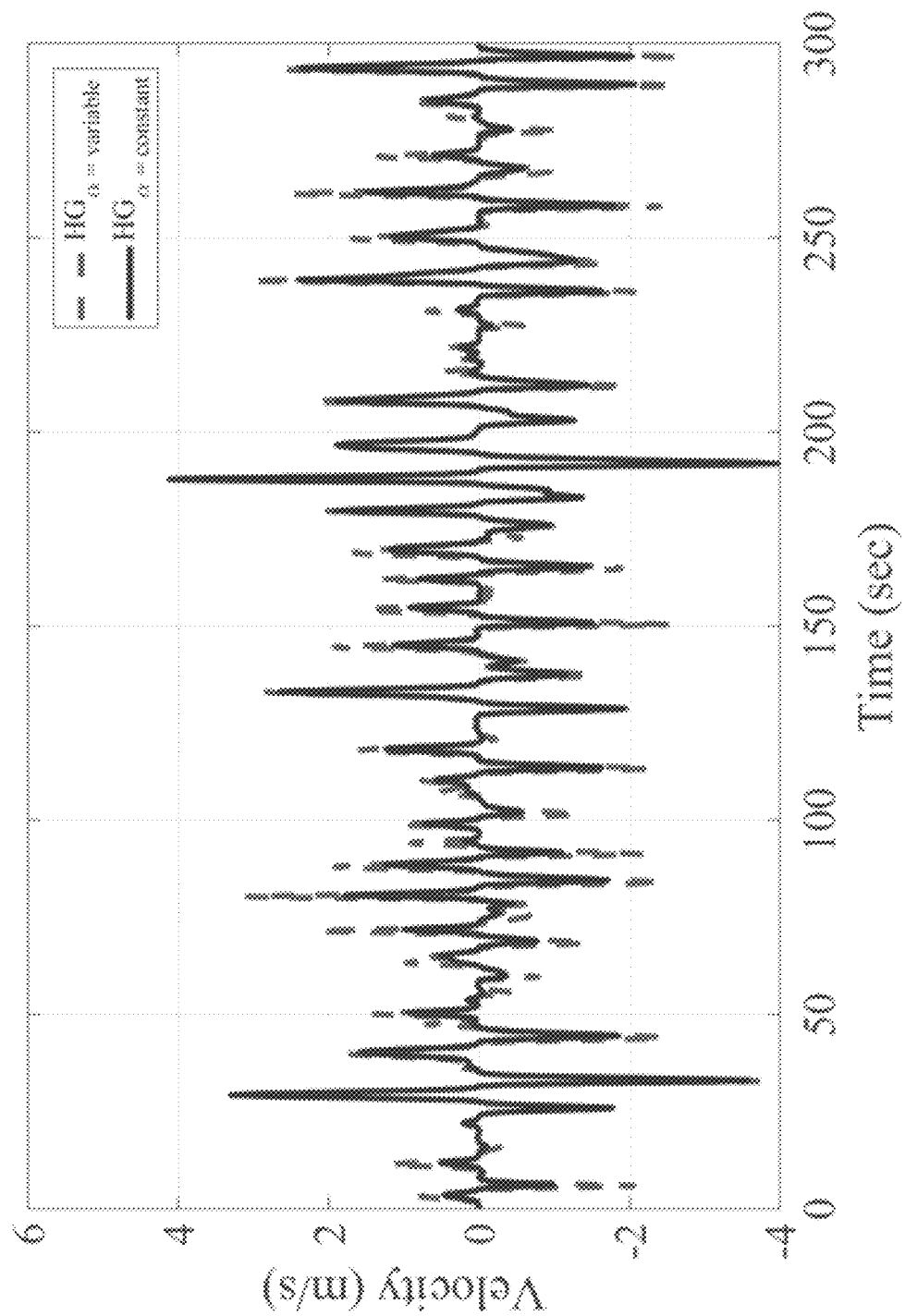
FIG. 10 is a graph of buoy velocity responses.

A Bretschneider spectrum with $T_p=11$ seconds and $H_s=6.9$ meters was employed with the corresponding wave input shown in FIG. 3. The steepness angle was varied as a function of time for the variable HG design, as shown in FIG. 4. FIG. 4 also includes the constrained draft heights for SS4. In comparing FIGS. 3 and 4, it is apparent that the steepness angle decreases in response to an increase in the wave height. The variable HG buoy was compared to an HG buoy with a constant steepness angle, set at $\alpha=65°$. The external forces $F_e$ and control forces $F_u$ for both constant and variable steepness angles are shown in FIGS. 5 and 6. The real and reactive powers are shown in FIGS. 7 and 8. Note that the nonlinear HG buoy design inherently produces the required reactive power shown in FIG. 8. The buoy positions and velocities are given in FIGS. 9 and 10. The energy captured for both the constant and variable HG buoys are given in Table III. By the varying steepness angle, further increases in power and energy capture were achieved.

TABLE III

Energy Captured Bretschneider Comparison.

| Steepness angle | Energy (MJ) |
|---|---|
| Constant (65°) | 69.80 |
| Variable | 104.6 |

The example described above assumed a mirrored right circular cone HG buoy with variable cone or steepness angle. However, other shapes and variations thereof can provide a cubic hardening spring equivalent. Indeed, whenever the buoy has a geometry such that a water plane area increases with distance away from the water line in the heave direction, then the hydrostatic force will be nonlinear. Typically, the buoy shape can be axisymmetric about the buoy axis but is not required to be so. Typically, the buoy can comprise opposing shapes that are mirrored about the water line. For example, the buoy shape can comprise a polynomial spline expansion of the form, $z=a+bx+cx^2+dx^3+ex^4+\ldots$ where a, b, c, d, and e are arbitrary coefficients, rotated about the vertical axis. For example, the shaped buoy can comprise a hyperboloid of revolution about the buoy axis. For example, the shaped buoy can comprise opposing hemispheres, pyramids, ellipsoids, or paraboloids. However, the opposing surfaces need not be mirrored geometries, symmetric about the water line, or of the same shape. In such cases, the shape of the buoy—i.e., the water plane area as a function of distance away from the water line —can be varied in time in response to the wave motion.

The present invention has been described as a wave energy converter buoy with variable geometry. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A wave energy converter, comprising:
a shaped buoy in a body of water having a wave motion, wherein the waves impacting the buoy exert an excitation force with a plurality of excitation frequencies on the buoy that causes a buoy motion in a heave direction relative to a reference and wherein the buoy has a geometry such that a water plane area of the buoy increases with distance away from the water line in the heave direction both above and below the water line, thereby producing reactive power from the wave motion; and
a controller configured to vary the external geometry of the buoy in response to the wave motion.

2. The wave energy converter of claim 1, wherein the shaped buoy comprises an hourglass geometry.

3. The wave energy converter of claim 2, wherein the hourglass geometry comprises mirrored right circular cones having a steepness angle.

4. The wave energy converter of claim 3, wherein the steepness angle is variable from 35 to 75 degrees.

5. The wave energy converter of claim 3, wherein the steepness angle is varied to harvest maximum energy from the wave motion.

6. The wave energy converter of claim 1, wherein the shaped buoy comprises opposing geometries that are mirrored about the water line.

7. The wave energy converter of claim 6, wherein the shaped buoy comprises mirrored hemispheres, pyramids, ellipsoids, paraboloids, or hyperboloids.

8. The wave energy converter of claim 1, wherein the shaped buoy comprises opposing geometries that are not mirrored about the water line.

9. The wave energy converter of claim 1, wherein the shaped buoy comprises a geometry of a polynomial spline expansion.

* * * * *